United States Patent [19]

Meckstroth

[11] Patent Number: 5,130,020

[45] Date of Patent: Jul. 14, 1992

[54] PORTABLE WATER FILTER UNIT HAVING STORAGE SPACE FOR FLEXIBLE TUBES

[76] Inventor: Alan F. Meckstroth, 2310 Far Hills Bldg., Dayton, Ohio 45419-1575

[21] Appl. No.: 574,755

[22] Filed: Aug. 30, 1990

[51] Int. Cl.⁵ .................. B01D 27/02; B01D 27/08
[52] U.S. Cl. ................................ 210/264; 210/282; 210/288; 210/416.3; 210/440; 210/443; 210/461; 210/497.01; 222/189; 222/530; 222/534; 206/216; 206/225; 206/226; 220/DIG. 7
[58] Field of Search .............. 210/263, 264, 282, 287, 210/288, 416.3, 440, 443, 457, 460, 461, 484, 486, 497.01, 497.2; 206/216, 225, 226; 220/DIG. 7; 222/189, 530, 534, 540

[56] References Cited

U.S. PATENT DOCUMENTS

| 2,566,371 | 9/1951 | Quinn ........................... 210/416.3 |
| 3,342,335 | 9/1967 | Gamundi et al. . |
| 4,013,562 | 3/1977 | Gott . |
| 4,049,550 | 9/1977 | Obidniak . |
| 4,178,249 | 12/1979 | Councill ........................... 210/282 |
| 4,218,317 | 8/1980 | Kirschmann ................... 210/416.3 |
| 4,271,015 | 6/1981 | Moore ............................ 210/282 |
| 4,287,057 | 9/1981 | Stanley . |
| 4,368,123 | 1/1983 | Stanley . |
| 4,556,484 | 12/1985 | Hunter et al. ................ 210/416.3 |
| 5,032,268 | 7/1991 | Hahn ............................. 210/282 |
| 5,035,798 | 7/1991 | Stenger ......................... 210/282 |

FOREIGN PATENT DOCUMENTS 563187 8/1944 United Kingdom ............ 210/416.3

Primary Examiner—Robert A. Dawson
Assistant Examiner—Wanda L. Millard
Attorney, Agent, or Firm—Jacox & Meckstroth

[57] ABSTRACT

A tall open top plastic container has a closed bottom portion sealed to the lower end portion of a tubular water filter member having an upper end portion sealed to a removable plastic top wall within the container and sealed to the container. Flexible water inlet and outlet tubes have inner end portions connected through the top wall to an annular inlet chamber surrounding the filter member and a center outlet chamber within the filter member. A flexible vinyl coupler body receives the outer end portion of the inlet tube and forms a friction connection with a faucet aerator. In one embodiment, the upper portion of the container defines a cavity above the removable top wall, and the flexible tubes are coiled within the cavity where they are retained along with the coupler body during storage by a removable snap-on cap. The cavity may also be formed by an annular wall molded integrally with the removable top wall and covered by a removable cap.

22 Claims, 1 Drawing Sheet

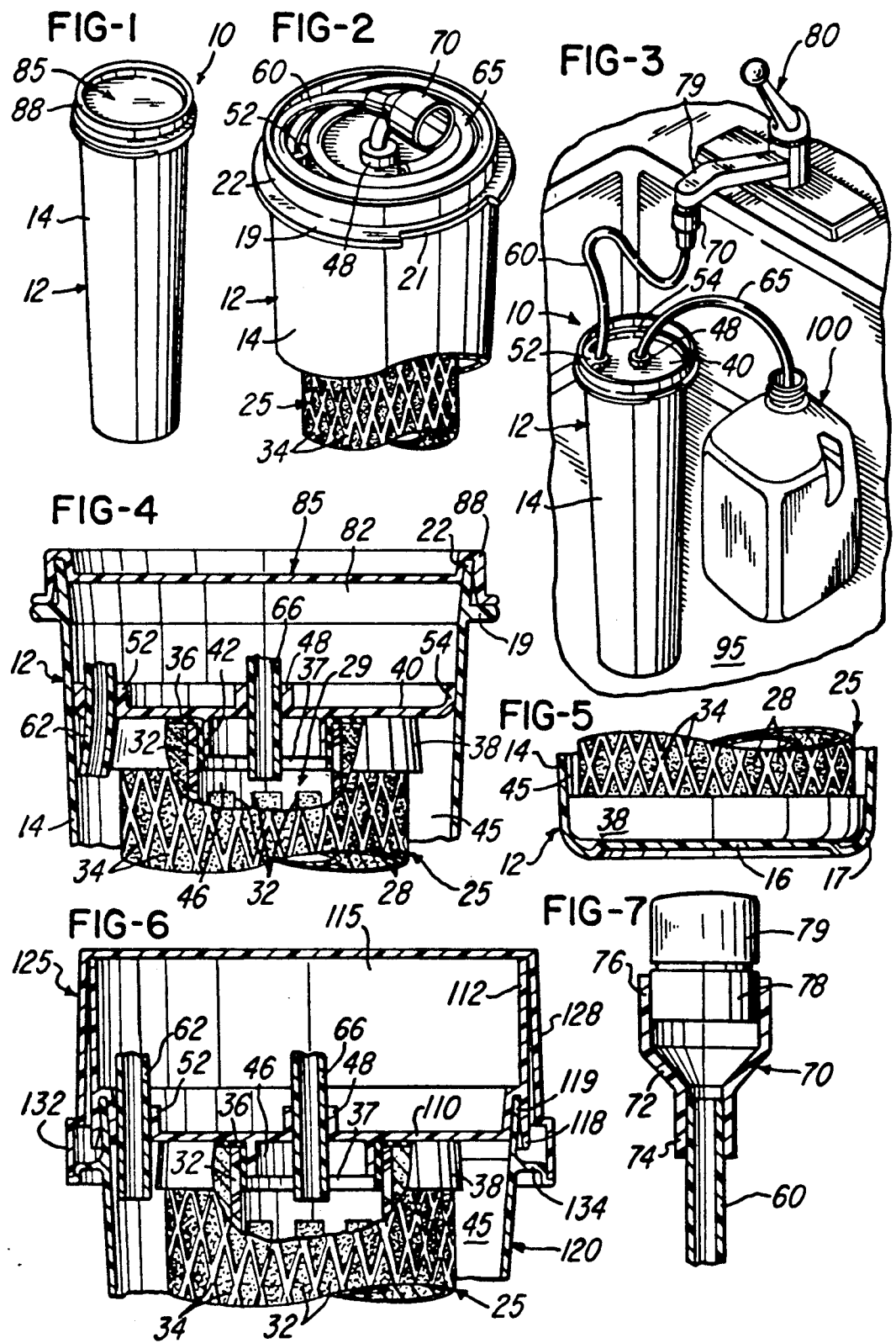

PORTABLE WATER FILTER UNIT HAVING STORAGE SPACE FOR FLEXIBLE TUBES

BACKGROUND OF THE INVENTION

In the art of portable water filter units, for example, of the general types disclosed in U.S. Pat. Nos. 3,342,335; 4,013,562; 4,049,550; 4,287,057 and 4,368,123, it is desirable to have a compact unit which can be conveniently stored within a cabinet such as a kitchen sink cabinet without any dripping or leakage of water from the unit and also be quickly and conveniently used within a kitchen sink where the unit may be quickly connected to a faucet having an aerator. It is also desirable for such a filter unit to use a high quality replaceable water filter cartridge, preferably with a carbon activated filter medium, and to incorporate a container assembly which is simple and inexpensive in construction and provides for conveniently removing the filter cartridge for periodic rinsing or replacement after a period of use. As apparent after reviewing the disclosures of the above patents, none of the portable water filter units disclosed in the patents provide all of these desirable features.

SUMMARY OF THE INVENTION

The present invention is directed to an improved portable water filter unit which is not only simple and economical in construction but may be quickly and conveniently used in a sink with a conventional faucet aerator and then quickly stored in a sanitary condition without any leakage of water from the unit. The filter unit of the invention is also adapted to use a standard and commercially available tubular water filter cartridge which provides effective filtration for a substantial volume of water. In addition, the filter cartridge may be conveniently and quickly installed within the unit and removed for rinsing or replacement. The filter unit also provides for convenient use in any type or size of sink and for filling various sizes of storage containers for filtered water.

In accordance with the invention, a vertical molded plastic container having a circular cross-section and an open top, receives a tubular water filter cartridge having a vertical axis common with the container. Resilient rubber-like annular caps on the ends of the cartridge form water-tight seals between the cartridge and the lower end portion of the container and with a removable plastic top wall which seats on the cartridge and seals with the surrounding wall of the container. The upper portion of the container cooperates with the top wall to define a chamber or cavity above the top wall.

A flexible plastic water inlet tube connects through the top wall with the annular water inlet chamber defined between the filter cartridge and the container, and a flexible plastic water outlet tube connects through the center of the top wall to the filtered water outlet chamber defined within the tubular filter cartridge. A flexible plastic tubular coupler receives the outer end portion of the water inlet tube and frictionally grips a standard aerator on a water faucet. The outer end portion of the water outlet tube is adapted to be inserted into a storage receptacle for filtered water. Both of the flexible water inlet and outlet tubes are coiled and inserted with the coupler into the cavity for storage, and a molded plastic cap member is releasably attached and sealed to the upper end portion of the container to enclose the flexible tubes and the coupler within the cavity. In a modified embodiment, the cavity is defined by an annular wall portion molded as an integral part of the removable top wall within the container.

Other features and advantages of the invention will be apparent from the following description, the accompanying drawing and the appended claims.

BRIEF DESCRIPTION OF THE DRAWING

FIG. 1 is a perspective view of a portable filter unit constructed in accordance with the invention; FIG. 2 is a fragmentary perspective view of the filter unit with the top cap member removed to illustrate the normally stored condition of the coiled water inlet and outlet tubes and the attachment coupler;

FIG. 3 is a perspective view of the water filter unit shown in FIGS. 1 and 2 and illustrating its use for filtering water received through a faucet aerator and for filling a storage receptacle;

FIG. 4 is a full size vertical section of the upper portion of the filter unit shown in FIGS. 1–2 and with most of the flexible inlet and outlet tubes broken away;

FIG. 5 is a fragmentary vertical section of the bottom portion of the container and with a portion of the filter cartridge shown in elevation;

FIG. 6 is a fragmentary axial section similar to FIG. 4 and illustrating a modified filter unit constructed in accordance with the invention; and FIG. 7 is an axial section through the flexible coupler and water inlet tube, shown attached to a faucet aerator.

DESCRIPTION OF THE PREFERRED EMBODIMENTS

Referring to the drawing, FIG. 1 illustrates a portable water filter unit 10 which includes an elongated vertical container 12 preferably molded of a semi-rigid plastics material such as polyethylene. The container 12 has a slightly tapered annular wall 14 of circular cross-section and projecting upwardly from an integrally molded bottom wall 16 having rounded bottom corner portion 17. The upper end portion of the container has an outwardly projecting flange 19 with diametrically opposite notches 21, and an upper lip portion 22 has an outward taper slightly greater than the taper of the container wall 14.

A tubular water filter cartridge 25 is positioned within the container 12 with the axis of the cartridge common with the axis of the container, and the illustrated filter cartridge 25 comprises an activated carbon filter media 28 surrounding a molded plastic tubular core 29 having closely spaced rectangular holes or openings 32. The filter media 28 is surrounded by a tube of an expanded molded plastic netting or mesh 34 which confines the filter media on the tubular core. One manufacturer of a water filter cartridge which has provided satisfactory results is F. I. Products in Elyria, Ohio. This cartridge includes a filter media of activated carbon impregnated paper for removing unpleasant taste, odors and chlorine. The media also effectively removes rust and sediment to 5 microns and is commonly used as a replacement cartridge for pressure type water filter units installed in the plumbing under a kitchen sink within a sink cabinet.

Each end of the filter cartridge 25 has an annular cup-like sealing element or cap 36 which is molded of a rubber-like material bonded to the end surface of the filter media and has inner and outer annular flanges 37 and 38 bonded to the plastic core and the plastic retaining mesh, respectively. The outer flange 38 of the resilient flexible cap 36 has an outer surface which tapers outwardly, as shown in FIGS. 4 and 5. The outer flange 38 firmly engages the inner surface of the container at the bottom of the container, as shown in FIG. 5, to form a fluid-tight seal between the lower end portion of the filter cartridge 25 and the lower end portion of the container 12.

A removable top wall 40 is positioned within the upper portion of the container and seats on the upper end surface of the filter cartridge 25. The top wall 40 is molded of a semi-rigid plastics material such as polyethylene and includes an annular rib 42 which projects downwardly to engage the inner flange 37 of the resilient cap 36 on the filter cartridge 25 to form a fluid-tight seal between the cartridge and the top wall. The integrally molded annular rib may also be larger in diameter and engage the outer flange 38 of the resilient cap 36 on the filter cartridge to form a fluid-tight seal. The annular rib 42 locates the upper end portion of the filter cartridge 25 concentrically within the upper end portion of the container 12 to define an annular water inlet chamber 45 between the filter cartridge 25 and the container wall 14. A filtered water outlet chamber 46 is defined within the center of the filter cartridge 25.

The top wall 40 also includes an integrally molded tubular portion 48 which projects upwardly from the center of the top wall. Another tubular portion or boss 52 projects upwardly from the top wall adjacent an upwardly projecting peripheral flange or lip portion 54 which forms a fluid-tight seal between the top wall 40 and the upper portion of the container 12. The top wall 40 has sufficient rigidity so that when it is pressed downwardly into the upper portion of the container 12 and firmly against the upper end surface of the filter cartridge 25, the top wall is tightly sealed against the filter cartridge and the container. This seal cooperates with the seal between the lower end portions of the filter cartridge and the container to assure that water does not seep around the outer ends of the filter cartridge 25 and flows only through the filter media 28. If desired, the lip portion 54 may have an external peripheral bead which projects outwardly into a mating annular groove within the inner surface of the container wall 14 to form a more positive connection at a fixed location.

A flexible plastic water inlet tube 60 has an inner end portion 62 projecting through the tubular portion 52 into the annular inlet chamber 45, and the tubular portion 52 forms a fluid-tight seal with the inner end portion of the inlet tube. A flexible plastic water outlet tube 65 has an inner end portion 66 projecting through the tubular projection 48 into the outlet chamber 46, and the tubular projection 48 forms a fluid-tight seal with the inner portion 66 of the outlet tube 65. Preferably, the tubes 60 and 65 are extruded from a flexible transparent material such as polycinylchloride.

A coupler 70 is attached to the outer end portion of the inlet tube 60 and preferably comprises a dip-molded tubular body 72 of flexible plastics material such as polyvinylchloride. The coupler body 22 has a smaller end portion 74 which receives the outer end portion of the inlet tube 60 and forms a fluid-tight seal with the end portion. The coupler body 72 also has a larger cylindrical portion 76 which is adapted to form a friction fit or engagement with a standard aerator 78 threadably attached to a swivel spout 79 of a conventional kitchen sink faucet 80.

The water inlet tube 60 and water outlet tube 65 have substantially the same length which is preferably about twelve inches. As illustrated in FIG. 2, the tubes 60 and 65 are adapted to be coiled and normally stored within a cavity 82 defined within the upper portion of the container 12 above the top wall 40. The cavity 82 is sufficiently large to also receive the flexible vinyl coupler 70, and the cavity is covered by a molded plastics cap member 85 which has a peripheral channel portion 88 receiving the upper lip portion 22 of the container 12 to form a snap-on connection and a fluid-tight seal.

The filter unit 10 is normally stored with the coiled water inlet and outlet tubes within the cavity 82 with the coupler 70 and covered by the cap member 85, as shown in FIG. 1. When it is desired to use the portable filter unit, the unit is removed from a storage cabinet and placed within a sink 95, as shown in FIG. 3. The cap 85 is removed by lifting the cap through one of the notches 21. The tubes are removed from the cavity 82, and the coupler 70 is pressed onto the aerator 78, as shown FIGS. 3 and 7. The faucet 80 is open to allow a small flow of water through the inlet tube 60 which enters the annular inlet chamber 45, flows inwardly through the filter media 28 of the filter cartridge 25 and then upwardly and outwardly through the outlet chamber 46 and the outlet tube 65 into a filtered water storage receptacle such as the blow molded plastic container 100 shown in FIG. 3.

Preferably, the friction grip of the coupler 70 onto the aerator 78 is such that if the water faucet 80 is opened so that the water flow is greater than a predetermined flow rate, the coupler 70 will expand and slide from the aerator. This prevents an excessive build up of pressure within the container 12 and prevents the top wall 40 from moving upwardly within the container from its seat on the upper end of the filter cartridge 25. After one or more containers 100 are filled with filtered water for storage, preferably in a refrigerator, the faucet 80 is shut off, the coupler 70 is pulled from the aerator 78, and the tubes 60 and 65 are coiled back into the storage cavity 82, as shown in FIG. 2. The cap member 85 is attached to the container to form a fluid-tight seal, and the unit 12 may then be placed back in a storage cabinet.

Referring to FIG. 6 which shows a modification of a portable filter unit constructed in accordance with the invention, a removable top wall 110 is molded from a semi-rigid plastics material similar to the top wall 40 shown in FIG. 4. The top wall 110 connects with an integrally molded annular wall 112 which projects upwardly to define a chamber or cavity 115 for receiving the coiled water inlet and water outlet tubes 60 and 65 and flexible coupler 70. The annular wall 112 also includes a downwardly projecting skirt portion 118 which snap-fits around an upper tapered lip portion 119 of a molded plastic container 120 to form a fluid-tight seal with the container in the same manner as the cap 85 snap-fits onto the lip 22. In the embodiment of FIG. 6, the cavity 115 is covered or enclosed by a cup-shaped cap member 125 which includes a downwardly projecting annular wall or skirt portion 128 surrounding the annular wall 112. The cap member 125 also has a slightly larger diameter bottom peripheral portion 132 which firmly engages and seats on an outwardly projecting flange 134 of the container 120. In all other respects, the filter unit shown in FIG. 6 is constructed the same as described above in connection with the filter unit shown in FIGS. 1-5 and 7, and the same reference numbers are used for the corresponding parts.

From the drawing and the above description, it is apparent that a portable water filter unit constructed in accordance with the invention, provides desirable features and advantages. As one important advantage, the filter unit is simple and economical in construction since there are no valves or fittings, and all of the plastic components are easily molded or extruded of relatively inexpensive plastics materials. The filter unit is also easy to use, simply by removing the cap and pressing the coupler 70 onto the faucet aerator 78. In addition, when the flexible water inlet and outlet tubes 60 and 65 are coiled and stored within the cavity 82 or 115 and closed by the snap-on cap member 85 or 125, the filter unit may be placed within a cabinet without any problem of water leakage and with the tubes and coupler stored in a sanitary enclosure.

As another feature, when it is desired to remove the filter cartridge 25 for rinsing or replacement, the top wall 40 or 110 is simply pulled upwardly by gripping and pulling upwardly on the tubular projection 52 for the water inlet tube 60. After the top wall and filter cartridge are removed, the container, top wall, and tubes 60 and 65 may be easily rinsed or cleaned before replacing or inserting a new filter cartridge.

While the form of filter unit herein described constitutes a preferred embodiment of the invention, it is to be understood that the invention is not limited to this precise form, and that changes may be made therein without departing from the scope and spirit of the invention as defined in the appended claims. For example, the connection of the top wall 40 or 110 to the container and/or the connection of the cap member 85 or 125 to the container may be made by a molded threaded connection to provide a quick twist lock in place of a snap-on or press-fit connection.

The invention having thus been described, the following is claimed:

1. A portable water filter unit adapted to be used within a sink and be conveniently stored in a cabinet when not in use, comprising a vertically extending container having a top opening and means forming a bottom wall, a water filter member disposed within said container and having a vertical axis, said container and said filter member defining therebetween an annular first chamber for receiving water, said filter member defining therein a second chamber for receiving water, means forming a top wall for confining said filter member within said container between said top and bottom walls and for confining water within said first and second chambers, means defining a cavity above said top wall, a flexible water inlet tube and a flexible water outlet tube having inner end portions connected to corresponding said chambers through said top wall, said inlet and outlet tubes having corresponding outer end portions, a coupling connected to said outer end portion of said inlet tube and adapted to be connected to a faucet, said outer end portion of said outlet tube adapted to be inserted into a storage receptacle for filtered water, and said tubes having stored positions coiled within said cavity to facilitate movement and storage of said unit.

2. A filter unit as defined in claim 1 wherein said container has an upper end portion forming said means defining said cavity, said top wall is removably inserted into said container and forms the bottom of said cavity, and means forming a substantially water-tight seal between said top wall and said container.

3. A filter unit as defined in claim 2 and including a cap member removably attached to said upper end portion of said container and covering said cavity for enclosing said flexible tubes and coupling within said cavity during storage.

4. A filter unit as defined in claim 1 wherein said cavity also receives said coupling with said tubes for storage, and a removable cap member for enclosing said tubes and coupling within said cavity.

5. A filter unit as defined in claim 1 wherein said container has a vertical height at least three times the horizontal width of said container.

6. A filter unit as defined in claim 1 wherein said coupling comprises a resilient tubular body having a smaller end portion receiving said outer end portion of said water inlet tube, said body having a larger end portion adapted to receive an aerator mounted on the faucet, and said larger end portion frictionally grips the aerator to provide for automatic removal of said body from the aerator in response to an excessive water pressure within said water inlet tube.

7. A filter unit as defined in claim 1 wherein said inner end portion of said water inlet tube is connected to said annular first chamber, and said inner end portion of said outlet tube is connected to said second chanber.

8. A filter unit as defined in claim 1 wherein said flexible water inlet and outlet tubes each comprises a polyvinyl chloride material.

9. A filter unit as defined in claim 1 wherein said means defining said cavity comprise an annular wall projecting upwardly from said top wall, said top wall and said annular wall being removable from said container for replacing said filter member, and a removable cap member covering said annular wall for enclosing said tubes within said cavity.

10. A portable water filter unit adapted to be used within a sink and be conveniently stored in a cabinet when not in use, comprising a vertically extending container having a top opening and means forming a bottom wall, a water filter member disposed within said container and having a vertical axis, said container and said filter member defining therebetween an annular first chamber for receiving water, said filter member defining therein a second chamber for receiving water, a removable top wall within said container for confining said filter member between said top and bottom walls and for confining water within said first and second chambers, means forming a substantially water-tight seal between said top wall and said container, an annular wall projecting upwardly from said top wall and defining a cavity above said top wall, a flexible water inlet tube and a flexible water outlet tube having inner end portions connected to corresponding said chambers through said top wall, said inlet and outlet tubes having corresponding outer end portions, a coupling connected to said outer end portion of said inlet tube and adapted to be connected to a faucet, said outer end portion of said outlet tube adapted to be inserted into a storage receptacle for filtered water, and said tubes having stored positions coiled within said cavity to facilitate movement and storage of said unit.

11. A filter unit as defined in claim 10 wherein said cavity also receives said coupling with said tubes for storage, and a removable cap member for enclosing said tubes and coupling within said cavity.

12. A filter unit as defined in claim 10 wherein said container has an upper end portion forming said annular wall defining said cavity.

13. A filter unit is defined in claim 10 and including a cap member releasably attached to said annular wall and covering said cavity for enclosing said flexible tubes and coupling within said cavity during storage.

14. A filter unit as defined in claim 10 wherein said coupling comprises a resilient tubular body having a smaller end portion receiving said outer end portion of said water inlet tube, said body having a larger end portion adapted to receive an aerator mounted on the faucet, and said larger end portion frictionally grips the aerator.

15. A filter unit as defined in claim 10 wherein said flexible waterinlet and outlet tubes each comprises a clear polyvinyl chloride material.

16. A filter unit as defined in claim 10 wherein said annular wall and said top wall are integrally molded as one piece.

17. A portable water filter unit adapted to be used within a sink and to be conveneintly stored in a cabinet when not in use, comprising a vertically extending container of molded plastics material and having a top opening and an integrally molded bottom wall portion, a tubular water filter cartridge disposed within said container and having a vertical axis, said container and said filter cartridge defining therebetween an annular first chamber, said filter cartridge defining therein an axially extending second chamber, means forming a fluid-tight seal between said filter cartridge and said bottom wall portion of said container, a removable top wall within said container and confining said filter cartridge within said container between said top wall and said bottom wall portion, an annular wall projecting upwardly from said top wall and defining a cavity above said top wall, a flexible water inlet tube and a flexible water outlet tube having inner end portions connected to corresponding said chambers through said top wall, said inlet and outlet tubes having corresponding outer end portions, a resilient coupling connected to said outer end portion of said inlet tube and adapted to be connected to a faucet aerator, said outer end portion of said outlet tube adapted to be inserted into a storage receptacle for filtered water, said tubes having sufficient flexibility to provide for coiling and confining said tubes within said cavity with said coupling, and a removable cap member releasably attached to said annular wall for enclosing said tubes and coupling within said cavity during storage of said unit.

18. A filter unit as defined in claim 17 wherein said container has an integrally molded upper end portion forming said annular wall defining said cavity.

19. A portable water filter unit adapted to be used within a sink and be conveniently stored in a cabinet when not in use, comprising a vertically extending container having a top opening and means forming a bottom wall, a water filter member disposed within said container and having a vertical axis, said container and said filter member defining therebetween an annular first chamber for receiving water, said filter member defining therein an axially extending second chamber for receiving water, means forming a removable top wall for confining said filter member within said container between said top and bottom walls and for confining water within said first and second chambers, means defining a cavity above said top wall, a flexible water inlet tube having an inner end portion connected to one of said chambers through said top wall and having an outer end portion, a coupling connected to said outer end portion of said inlet tube and adapted to be connected to a faucet, means defining an outlet passage and connected to the other said chamber for dispensing filtered water, and said inlet tube having a stored position coiled within said cavity of facilitate movement and storage of said unit.

20. A filter unit as defined in claim 19 wherein said cavity also receives said coupling during storage, and a removable cap member for enclosing said water inlet tube and coupling within said cavity.

21. A filter unit as defined in claim 19 wherein said container has an upper end portion forming said means defining said cavity, said top wall is removably inserted into said container and forms the bottom of said cavity, and means forming a generally water-tight seal between said top wall and said container.

22. A filter unit as defined in claim 19 wherein said means defining said cavity comprise an annular wall projecting upwardly from said top wall and being removable with said top wall for replacing said filter member.

* * * * *